United States Patent [19]

Stieber

[11] 4,131,799
[45] Dec. 26, 1978

[54] IONIZATION CHAMBER

[75] Inventor: Volker A. W. Stieber, Lafayette, Calif.

[73] Assignee: Applied Radiation Corporation, Walnut Creek, Calif.

[21] Appl. No.: 783,630

[22] Filed: Apr. 1, 1977

[51] Int. Cl.² .................................... H01J 39/285
[52] U.S. Cl. .................................................. 250/385
[58] Field of Search ................ 250/374, 385, 389, 375

[56] References Cited

U.S. PATENT DOCUMENTS

| 3,852,610 | 12/1974 | McIntyre | 250/385 |
| 3,884,817 | 5/1975 | Jilbert | 250/385 |
| 3,942,012 | 3/1976 | Boux | 250/385 |
| 3,997,788 | 12/1976 | Boux | 250/385 |
| 4,047,040 | 9/1977 | Houston | 250/385 |

Primary Examiner—Alfred E. Smith
Assistant Examiner—Janice A. Howell
Attorney, Agent, or Firm—Hill, Gross, Simpson, Van Santen, Steadman, Chiara & Simpson

[57] ABSTRACT

An ionization chamber for analyzing inhomogeneities in a radiated beam from a particle accelerator system has two measuring chambers formed by three mutually parallel walls spaced apart by spacer rings. Two of the three walls have single electrodes arranged thereon whereas a third wall has several mutually insulated electrodes applied on a measuring chamber side of the wall. The mutually insulated electrodes include a central circular electrode and a group of electrode segments arranged in circular fashion around the central electrode. Inhomogeneities in the radiation intensity of a beam being analyzed are detected by unequal currents in the central electrode relative to surrounding electrode segments or in the electrode segments themselves relative to each other.

21 Claims, 4 Drawing Figures

IONIZATION CHAMBER

BACKGROUND OF THE INVENTION

Field of the Invention

The invention relates to an ionization chamber, preferably for use with particle accelerators. The ionization chamber has measuring chambers formed by three mutually parallel walls and two inserted spacer rings, wherein at least two of the three walls contain one individual electrode but the third wall contains several mutually insulated electrodes. All of the electrodes are guided towards outer contact lugs.

Description of the Prior Art

In the case of particle accelerators which are used for exposing a field to a radiation of either gamma rays, electrons, or charged atom nuclei, it is necessary to monitor and analyze the radiation exiting from the accelerator. Not only is the entire radiation intensity which exits of importance, but also whether the distribution within the beam cone is even which exits from the acceleration tube and the component elements positioned thereafter, such as the target, electron absorber, compensating member, deflection magnets, etc. For such monitoring, ionization chambers are usually employed. Each ionization chamber provides the average dosage of radiation occurring in the volume covered by it. In order to obtain a statement about the intensity distribution within a beam cone, a matrix of dot-shaped ionization chambers would be required. This, however, is neither desired for financial reasons, nor is it technically feasible. It is preferred to use a simple ionization chamber which still permits an evaluation of the intensity distribution in the beam cone.

For this purpose, U.S. Pat. No. 3,852,610 discloses a construction of an ionization chamber for use with particle accelerators. The chamber has two disc-shaped measuring chambers formed between three mutually parallel walls. The two outer walls of the measuring chambers consist of a film upon which a single continuously conductive layer is applied, i.e. one individual electrode. A mica layer is used for the center wall of the ionization chamber. Two concentric electrode rings having conductive layers each subdivided into segments serving as four individual electrodes, are guided outwardly towards separate terminal clamps. The center of this wall and the surfaces between and beyond the electrodes themselves are formed as auxiliary electrodes and have essentially the same potential as the electrodes of the same measuring chamber wall. With this ionization chamber which can be produced with favorable self-absorption parameters, it is considered a disadvantage that it does not react to all types of inhomogeneities in the radiation pattern of the exiting beam cone.

Further improvements with respect to the analysis of homogeneity of the radiation pattern in the beam cone had been expected from an ionization chamber disclosed in U.S. Pat. No. 3,942,012. This ionization chamber, which is designed with a multitude of individual wall elements, is relatively expensive to produce, however, and has a relatively high self-absorption characteristic due to the multitude of absorbing planes. The latter is an important disadvantage, particularly in the analysis of an electron beam.

SUMMARY OF THE INVENTION

It is an object of this invention to provide an ionization chamber which is simple and inexpensive to produce and which still permits a sufficiently precise analysis of the homogeneity of the exiting beam cone. The chamber must also react with sufficient sensitivity both to axially symmetric, as well as to axially unsymmetric inhomogeneities. It is a further object of the invention that the ionization chamber have a low self-absorption characteristic, and thus will be especially useful for measuring electron beams.

Achievement of the above stated objective is based on the recognition that a number of specific causes underlie the occurring inhomogeneities and that for the detection of these inhomogeneities specific measuring positions are provided in certain predetermined beam regions.

In the case of an ionization chamber of the invention, an outer wall of one of the two measuring chambers is provided with mutually insulated electrodes which are applied to the measuring chamber side of the wall. This results in the advantage that two different measuring chambers are obtained without an increase of the number of chamber walls. For one of the measuring chambers, this permits an analysis of radiation intensity integrated over the entire surface of the beam cone. For the other parallel measuring chamber, an analysis of the radiation intensity in certain selected regions of the beam cone can be performed. In addition, the sums of the ionization currents in both measuring chambers with respect to their surfaces can be compared with one another. If these sums are not equal, then a fault in either one of the measuring chambers or in the follow-up signal processing will be indicated.

An increase in sensitivity of the ionization chamber with respect to inhomogeneities distributed symmetrically about the center beam can be obtained if the wall with the mutually insulated electrodes contains a central circular disc-shaped electrode around which the remaining electrodes are grouped in segment-like fashion. It has been found that for a large number of inhomogeneities of the beam cone symmetrically distributed with respect to the center beam, an intensity extreme occurs in the center of the beam cone and an opposite extreme occurs at the outer circumference of the beam cone. This includes, for instance, all those interferences which are produced by scattering foils or compensating members which are erroneously selected in relation to the adjusted acceleration energy or type of radiation, respectively.

A further increase of the reaction sensitivity of the ionization chamber can be obtained when the electrodes which are mutually insulated on the same wall side and which are associated with a center circular disc-shaped measuring electrode, are formed as a ring surrounding the center measuring electrode and consist of several mutually insulated measuring electrodes. An auxiliary electrode is also provided which surrounds the remaining electrodes. By comparing the measured values of the center circular disc-shaped measuring electrode with the measuring electrodes surrounding the latter in a ring-shaped manner, those regions of the beam cone are included which, in the case of symmetric inhomogeneities, have an extremely different intensity characteristic with respect to the center region. Due to the segment-like subdivision of the mutually insulated measuring electrodes formed in a ring and surrounding the center measuring electrode, the sensitivity with respect to inhomogeneities arranged unsymmetrically with respect to the center beam is also provided.

DESCRIPTION OF THE PREFERRED EMBODIMENTS

Figure 1:
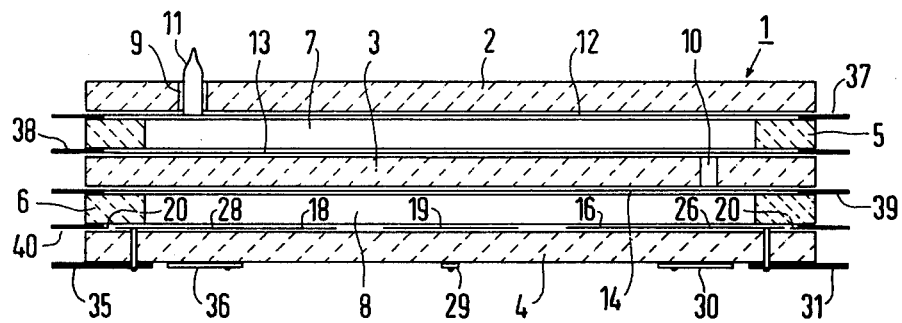
FIG. 1 is a cross sectional view of an ionization chamber of this invention for the examination of an x-ray cone.

FIG. 1 illustrates the design of the ionization chamber 1 having three ceramic discs 2, 3, 4, which are placed one upon the other and spaced with ceramic material spacing rings 5, 6 in such a way that two measuring chambers 7, 8 will result. The center and one of the outer ceramic discs each have a fine boring 9, 10 (2 mm diameter), respectively. The boring provided in the outer ceramic disc 2 is closed by a pinch tube 11. The sides of the individual ceramic discs which are turned towards one another have been provided with conductive surfaces, namely the electrodes 12, 13, 14, 15, 16, 17, 18, 19, and 20 (also see FIG. 3).

Figure 2:
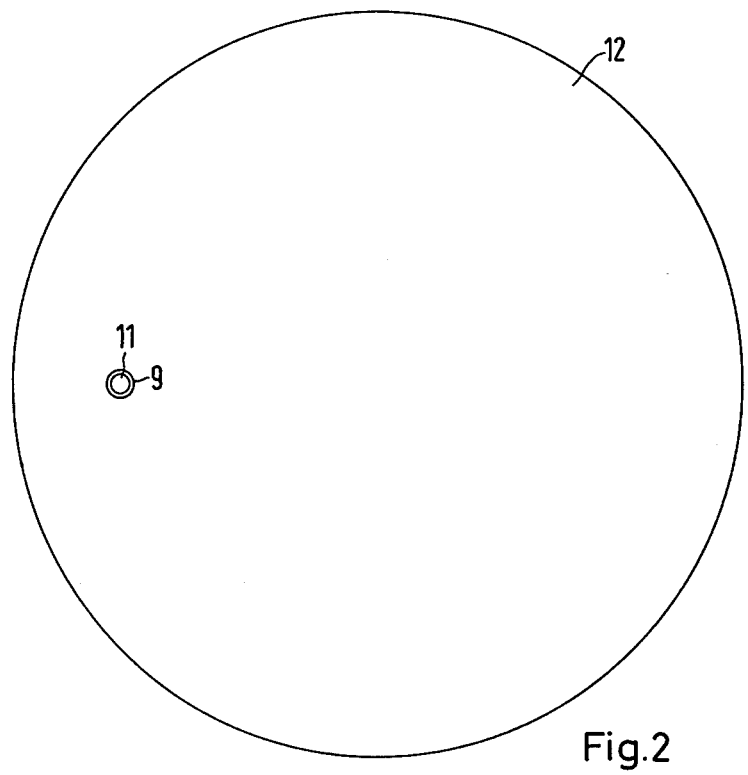
FIG. 2 is a plan view of the electrodes on the upper walls which are not subdivided.

FIG. 2 illustrates a plan view of the measuring electrode 12 which is not subdivided, on the upper ceramic disc 2 of FIG. 1. The electrode completely covers the entire surface of the ceramic discs. The electrodes 12, 13, and 14 look exactly alike. In the case of the center ceramic disc 3, the conductive surface 13 also extends via the inner wall of the boring 10 through to the other side and into contact with the conductive surface 14 positioned there.

Figure 3:
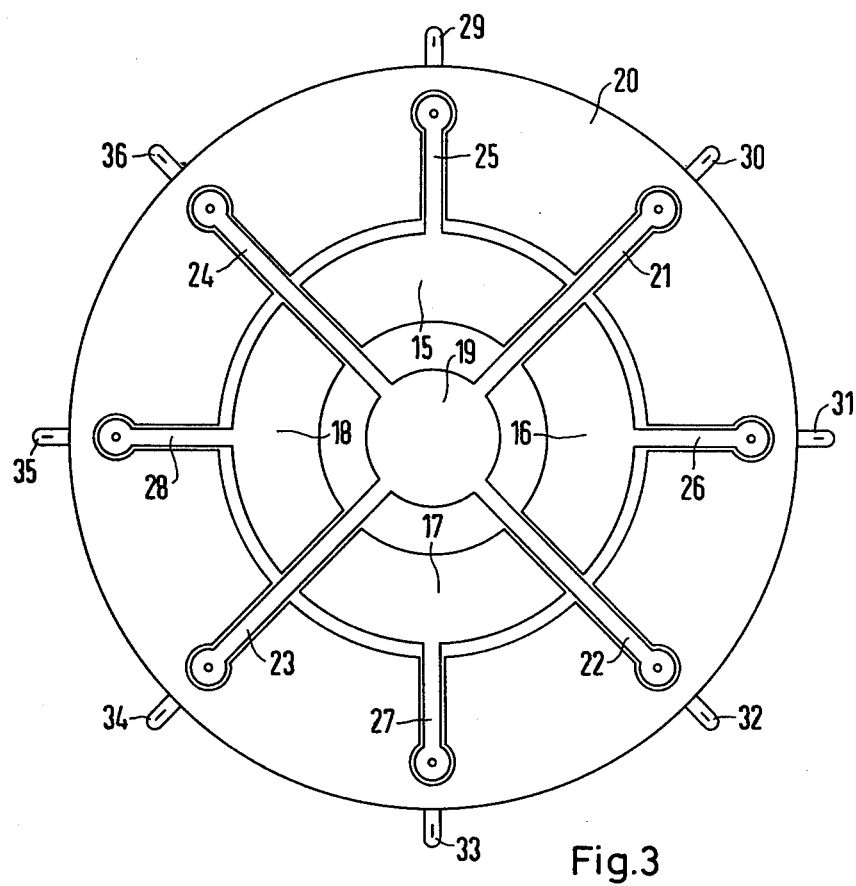
FIG. 3 is a plan view of the subdivided electrode of the lower chamber wall of FIG. 1.

FIG. 3 illustrates a plan view of the electrode arrangement of the lower ceramic disc 4 shown in FIG. 1. In the plan view, six different electrodes 15, 16, 17, 18, 19, and 20 can be seen. In the center of the ceramic disc 4, a circular disc-shaped measuring electrode 19 is provided having four terminal lines 21, 33, 23, 24 which are guided almost to the edge of the ceramic disc 4. An electrode ring which is spaced somewhat from the center of the ceramic disc consists of the four individual measuring electrodes 15, 16, 17, 18, together with their terminal lines 25, 26, 27, 28. A conductive surface serving as an auxiliary electrode 20 surrounds the ring shaped arrangement of four measuring electrodes 15, 16, 17, 18. Electrode 20 also surrounds the individual terminal lines of the measuring electrodes.

The outer circumference of the ring shaped arrangement of four electrodes corresponds to the outer circumference of the beam cone within the ionization chamber 1. Contact lugs 29 through 36 are attached on the outer side of the ceramic disc 4 respectively below the individual terminal lines and are connected to the terminal lines 21 through 28 through borings. The auxiliary electrode 20 of the outer ceramic disc 4, and the continuous electrodes 12, 13, 14, of the two other ceramic discs 3, 4 rest against metal rings 37, 38, 39, 40 which have been placed between the ceramic discs 2, 3, 4 and the ceramic rings 5, 6. Protruding outer circumference portions of the metal rings serve for contacting purposes.

During the operation of the ionization chamber 1, the electrodes 13, 14 on both sides of the center ceramic disc 3 are brought to a high voltage. This high voltage need only be connected to one of the two metal rings 38, 39.

Due to the conductive path through the boring 10 both electrodes 13, 14 are simultaneously connected. The application of the high voltage can be brought about via either metal ring. The auxiliary electrode 20 of the ceramic disc 4, which surrounds the individual mutually insulated measuring electrodes 15 through 19, is grounded. The measuring electrodes are approximately at ground potential. Thus, the electric field in the region of the lower measuring chamber 8 is subdivided into five different defined regions. The electric field of the upper measuring chamber 7 in FIG. 1 comprising the two single piece electrodes 12, 13, is not subdivided. The measuring volume, however, is exactly defined by the limitation of the chamber volume due to the ring-shaped ceramic disc 5.

Due to the radiation, ions are produced in a gas within the two measuring chambers 7, 8. These ions are accelerated due to the potential difference and polarity orientation between the measuring electrodes 12, 15 through 19 and the respective opposite electrodes 13, 14. The current between the individual mutually opposite electrodes is exactly proportional to the radiation intensity in the chamber volume in the region of the respective measuring electrode in the case of a correct chamber voltage and average radiation intensity. In the case of a completely homogeneous radiation intensity in the beam cone, the currents in the measuring electrodes of the chamber are equal. If the currents through the individual equal area measuring electrodes in ring-shaped arrangement differ, then this indicates an unsymmetrical distribution of the radiation intensity in the beam cone. If, however, the currents through the individual measuring electrodes 15 through 18 are equal, but different with respect to the current of the center circular disc-shaped measuring electrode 19, then this indicates an inhomogeniety of the radiation intensity in the beam cone which is symmetrical to the axis of symmetry of the chamber 1, i.e. to the center of the beam cone. Tests have shown that the greatest sensitivity with respect to such inhomogeneities symmetrical to the center of the beam cone is obtained when the center of the beam cone is compared with its marginal regions. The four ring-shaped measuring electrodes 15 through 18 are arranged in these marginal regions of the beam cone.

Figure 4:
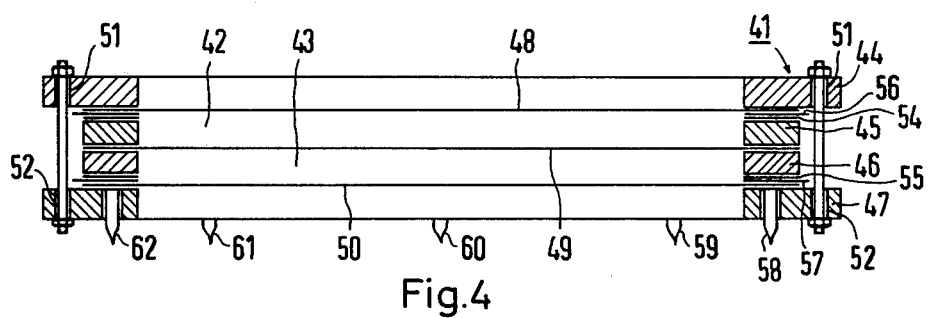
FIG. 4 is an alternate embodiment of the ionization chamber of this invention for the examination of an electron beam cone.

Finally, FIG. 4 shows a cross section through an ionization chamber 41 which is particularly suited for measuring an electron beam cone. In the case of this ionization chamber, due to the particularly low self-absorption, continuous ceramic discs for subdividing the two measuring chambers 42, 43 were not used. Instead, the ionization chamber consists of four superimposed metal rings 44, 45, 46, 47 with three plastic films 48, 49, 50 mounted therebetween. The two outer metal rings 44, 47 have a somewhat greater diameter than the inner metal rings 45, 46. They have borings 51, 52 at their circumference through which they can be screwed to one another and mounted together. The plastic films 48, 49 between the metal rings are provided with layers in the same manner as shown in FIG. 2. The plastic film 50 is provided with layers as shown in FIG. 3. The metal rings 45, 46 simultaneously serve as electric terminals for both the layers of the plastic film 49. Each is insulated with respect to the next outer metal ring by way of interposed ring-shaped plastic foils 54, 55. It would also be possible to use separate insulation rings. Between these ring-shaped plastic foils and the outer plastic films 48, 49, respectively, a ring-shaped metal foils 56, 57, is inserted. These ring-shaped metal foils serve as electrical terminals for the inner layers of the plastic films 48, 49. The lower metal ring 57 in FIG. 4 is provided with borings which are parallel to its axis of symmetry. Individual terminal lines are guided through these borings to the electrode surfaces on the mounted plastic film 50, which is provided with electrodes in accordance with the pattern shown in FIG. 3. The terminal lines 59, 60, 61, 62, are guided out of this metal ring 47 in insulated fashion.

Other alternate embodiments of the chamber of this invention are useful. For example, one of the walls which separates the two measuring chambers may be made of a fine wire net. Also, the single electrodes on two of the walls may be comprised of a nickel pattern etched on a plastic layer. Finally, the single electrodes and the mutually insulated electrodes may be evaporated onto a plastic layer.

Although various minor modifications may be suggested by those versed in the art, it should be understood that it is intended to embody within the scope of the patent warranted hereon, all such embodiments as reasonably and properly come within the scope of this contribution to the art.

Claimed as the invention:

1. An ionization chamber for use with particle accelerators, comprising:
   a) two measuring chambers formed by three mutually parallel walls which are spaced by spacer rings;
   b) two of the three walls each having a single electrode mounted thereto;
   c) a third one of said three walls which forms an outer wall for one of said two measuring chambers having means for measuring substantially all inhomogeneities of a radiation intensity distribution pattern of a cone of rays, said means including a plurality of mutually insulated electrodes applied on a side of the third wall within the measuring chamber; and
   d) the mutually insulated electrodes being connected to outer contact lugs.

2. An ionization chamber in accordance with claim 1, characterized in that the mutually insulated electrodes on the third wall include a center circular disc-shaped electrode around which segment-like electrodes have been grouped.

3. An ionization chamber in accordance with claim 1, characterized in that the mutually insulated electrodes on the third wall include a center circular disc-shaped measuring electrode, a ring of several mutually insulated individual measuring electrodes and an auxiliary electrode surrounding the ring of measuring electrodes.

4. An ionization chamber in accordance with claim 3, characterized in that contact paths connect with the center electrode and ring of measuring electrodes and that an auxiliary electrode surrounds the measuring electrodes and fills in gaps between the contact paths.

5. An ionization chamber in accordance with claim 1, characterized in that the three walls comprise ceramic discs.

6. An ionization chamber in accordance with claim 1, characterized in that the one of said three walls which separates the two measuring chambers is provided with at least one small aperture through which electrodes on either side of the separating wall are electrically connected.

7. An ionization chamber in accordance with claim 1, characterized in that one of said three walls which separates the two measuring chambers is made of a fine wire net.

8. An ionization chamber in accordance with claim 1, characterized in that the single electrodes on the two walls comprise a nickel pattern etched on a plastic layer.

9. An ionization chamber in accordance with claim 1, characterized in that the single electrodes and the mutually insulated electrodes are provided on a plastic layer and comprise evaporation deposited electrodes.

10. An ionization chamber in accordance with claim 1, in which the mutually insulated electrodes on the third wall includes a central electrode, a group of electrodes formed in a ring about the central electrode, and an auxiliary electrode surrounding the ring.

11. An ionization chamber used with a particle accelerator for measuring the homogeneity of radiation intensity of a radiated beam, comprising:
   a) two gas-filled measuring chambers formed by a central wall and two parallel exterior walls separated by spacing means;
   b) one of the measuring chambers having a single electrode on each of two opposite walls of the chamber; and
   c) the other measuring chamber having a single electrode on one wall and on an opposite wall a pattern of mutually insulated electrodes including a central electrode and a plurality of segmented electrodes in a ring-shaped symmetrical pattern about said central electrode.

12. The chamber of claim 11 in which the pattern of mutually insulated electrodes as arranged on an exterior wall and the ring-shaped symmetrical pattern corresponds to outer edge regions of the radiation intensity of the beam to be analyzed.

13. An ionization chamber for use with particle accelerators, comprising:
   a) two measuring chambers formed by three mutually parallel walls which are spaced by spacer rings;
   b) two of the three walls each having a single electrode mounted thereto;
   c) a third one of said three walls which forms an outer wall for one of said two measuring chambers having means for measuring substantially all imhomogeneities of a radiation intensity distribution pattern of a cone of rays, said means including a plurality of mutually insulated electrodes applied on a side of the third wall within the measuring chamber; and
   d) the mutually insulated electrodes being connected to outer contact lugs, the mutually insulated electrodes including a center circular disc-shaped measuring electrode, a ring of several mutually insulated individual measuring electrodes symmetrically arranged in a pattern about the center electrode, an auxiliary electrode surrounding the ring of measuring electrodes, and said pattern of symmetrically arranged electrodes corresponding to outer edge regions of radiation intensity of a beam to be analyzed.

14. An ionization chamber in accordance with claim 13, characterized in that contact paths connect with the center electrode and ring of measuring electrodes and that an auxiliary electrode surrounds the measuring electrodes and fills in gaps between the contact paths.

15. An ionization chamber in accordance with claim 13, characterized in that the three walls comprise ceramic discs.

16. An ionization chamber in accordance with claim 13, characterized in that the one of said three walls which separates the two measuring chambers is provided with at least one small aperture through which electrodes on either side of the separating wall are electrically connected.

17. An ionization chamber in accordance with claim 13, characterized in that one of said three walls which separates the two measuring chambers is made of a fine wire net.

18. An ionization chamber in accordance with claim 13, characterized in that the single electrodes on the two walls comprise a nickel pattern etched on a plastic layer.

19. An ionization chamber in accordance with claim 13, characterized in that the single electrodes and the mutually insulated electrodes are evaporated onto a plastic layer.

20. An ionization chamber in accordance with claim 13, in which the mutually insulated electrodes on the third wall includes a central electrode, a group of electrodes formed in a ring about the central electrode, and an auxiliary electrode surrounding the ring.

21. An ionization chamber used with a particle accelerator for measuring the homogeneity of a radiation intensity pattern of a radiated beam, comprising:
   a) two gas-filled measuring chambers formed by a central wall and two parallel exterior walls separated by spacing means;
   b) one of the measuring chambers having a single electrode on each of two opposite walls of the chamber;
   c) the other measuring chamber having means for measuring substantially all inhomogeneities of the radiation intensity pattern, said means including a single electrode on one wall and on an opposite wall a pattern of mutually insulated electrodes including a central disc-shaped measuring electrode and a plurality of segmented mutually insulated measuring electrodes in a ring-shaped symmetrical pattern about said central electrode and an auxiliary electrode surrounding the measuring electrodes; and
   d) the pattern of mutually insulated measuring electrodes being arranged on an exterior wall and the ring-shaped symmetrical pattern corresponding to outer edge regions of the radiation intensity of the beam to be analyzed.

* * * * *